US012625029B2

(12) United States Patent
Akutsu et al.

(10) Patent No.: US 12,625,029 B2
(45) Date of Patent: May 12, 2026

(54) ABNORMAL NOISE REPRODUCTION DEVICE AND ABNORMAL NOISE REPRODUCTION METHOD THEREOF

(71) Applicant: Honda Motor Co., Ltd., Tokyo (JP)

(72) Inventors: Susumu Akutsu, Tokyo (JP); Katsuji Tamazawa, Tokyo (JP); Naoyuki Otsuka, Tokyo (JP); Masayuki Hashimoto, Tokyo (JP); Toshiyuki Ohtsuka, Tokyo (JP); Mikiyasu Hayashi, Tokyo (JP); Shogo Iguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 18/583,790

(22) Filed: Feb. 21, 2024

(65) Prior Publication Data
US 2024/0302245 A1 Sep. 12, 2024

(30) Foreign Application Priority Data
Mar. 8, 2023 (CN) .......................... 202310217316.5

(51) Int. Cl.
| | |
|---|---|
| *G01M 7/02* | (2006.01) |
| *G01M 17/007* | (2006.01) |
| *H04R 1/46* | (2006.01) |

(52) U.S. Cl.
CPC .......... *G01M 7/025* (2013.01); *G01M 17/007* (2013.01); *H04R 1/46* (2013.01)

(58) Field of Classification Search
CPC ........ G01M 7/025; G01M 17/007; H04R 1/46
See application file for complete search history.

(56) References Cited

U.S. PATENT DOCUMENTS

| | | | | | |
|---|---|---|---|---|---|
| 2,970,479 | A | * | 2/1961 | Wikstrom ............... | G01P 15/10 |
| | | | | | 310/25 |
| 4,805,456 | A | * | 2/1989 | Howe ................... | G01P 15/097 |
| | | | | | 73/DIG. 1 |

(Continued)

FOREIGN PATENT DOCUMENTS

| | | | | | |
|---|---|---|---|---|---|
| CN | 107525680 | A | * | 12/2017 | .......... G01M 17/007 |
| CN | 112611569 | A | * | 4/2021 | ............. G01H 17/00 |

(Continued)

*Primary Examiner* — Chico A Foxx
(74) *Attorney, Agent, or Firm* — JCIPRNET

(57) ABSTRACT

An abnormal noise reproduction device and an abnormal noise reproduction method thereof are provided in the disclosure. The abnormal noise reproduction device includes at least one measuring device, an analysis device, and a vibration device. The at least one measuring device includes a contact microphone and an accelerometer. The contact microphone is disposed on the abnormal noise generating part of a vehicle, senses vibration sound of the abnormal noise generating part, and generates a vibration sound signal. An acceleration signal is generated by synchronously sensing acceleration of the contact microphone over a time sequence through the accelerometer. The analysis device determines when the abnormal noise generating part produces abnormal noise according to the vibration sound signal. The vibration device applies vibration to the vehicle and reproduces the acceleration signal corresponding to the abnormal noise.

12 Claims, 10 Drawing Sheets

(56) References Cited

U.S. PATENT DOCUMENTS

| | | | | |
|---|---|---|---|---|
| 7,970,148 B1 * | 6/2011 | Remington | ...... | G10K 11/17861 |
| | | | | 381/71.7 |
| 2003/0088346 A1 * | 5/2003 | Calkins | ................. | G01H 1/003 |
| | | | | 73/78 |
| 2018/0120264 A1 * | 5/2018 | Sato | .................... | G01M 17/007 |
| 2018/0211647 A1 * | 7/2018 | Tani | ................ | G10K 11/17833 |
| 2020/0288250 A1 * | 9/2020 | Ye | ........................... | G10L 19/00 |

FOREIGN PATENT DOCUMENTS

| | | | | | | |
|---|---|---|---|---|---|---|
| CN | 118395073 A | * | 7/2024 | .......... | G06F 17/142 |
| DE | 102021115749 B4 | * | 9/2023 | ............. | H02P 29/50 |
| JP | 2004286634 | | 10/2004 | | |
| WO | WO-2008051144 A1 | * | 5/2008 | .......... | B62D 15/029 |

* cited by examiner

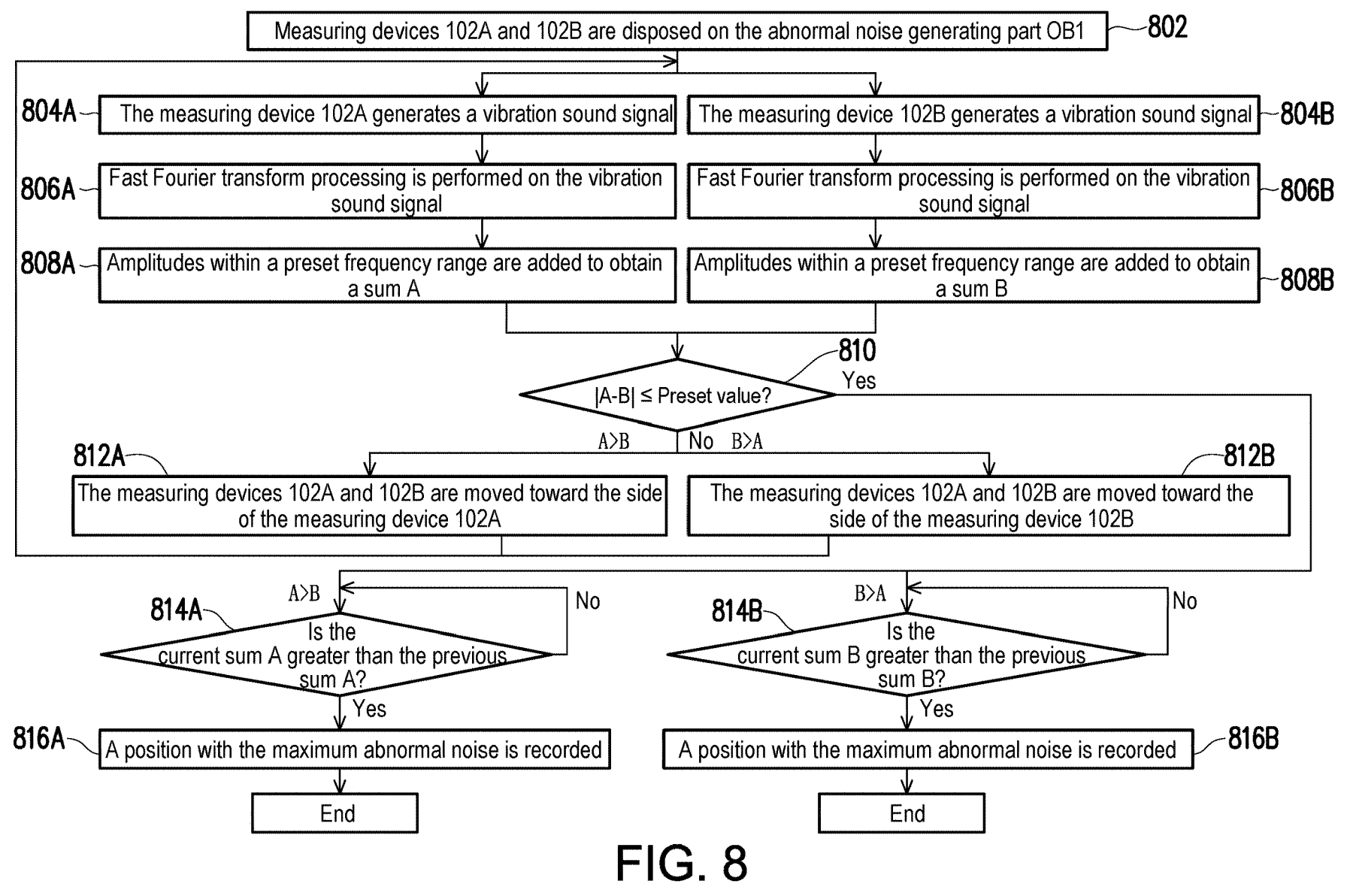

Measuring devices 102A and 102B are disposed on the abnormal noise generating part OB1 — 802

The measuring device 102A generates a vibration sound signal — 804A

Fast Fourier transform processing is performed on the vibration sound signal — 806A Amplitudes within a preset frequency range are added to obtain a sum A — 808A The measuring device 102B generates a vibration sound signal — 804B Fast Fourier transform processing is performed on the vibration sound signal — 806B Amplitudes within a preset frequency range are added to obtain a sum B — 808B

|A-B| ≤ Preset value? — 810

Yes

No    B>A

A>B

The measuring devices 102A and 102B are moved toward the side of the measuring device 102A — 812A The measuring devices 102A and 102B are moved toward the side of the measuring device 102B — 812B Is the current sum A greater than the previous sum A? — 814A A>B    No Yes Is the current sum B greater than the previous sum B? — 814B B>A    No Yes A position with the maximum abnormal noise is recorded — 816A A position with the maximum abnormal noise is recorded — 816B End End

FIG. 8

ABNORMAL NOISE REPRODUCTION DEVICE AND ABNORMAL NOISE REPRODUCTION METHOD THEREOF

CROSS-REFERENCE TO RELATED APPLICATION

This application claims the priority benefit of China application serial no. 202310217316.5 filed on Mar. 8, 2023. The entirety of the above-mentioned patent application is hereby incorporated by reference herein and made a part of this specification.

BACKGROUND

Technical Field

The disclosure relates to an abnormal noise reproduction device and an abnormal noise reproduction method thereof, and in particular relates to an abnormal noise reproduction device that may accurately measure abnormal noise and reproduce the abnormal noise, and an abnormal noise reproduction method thereof.

Description of Related Art

During vehicle operation, the various parts of the vehicle experience vibrations due to the unevenness of the road surface. Some parts may generate abnormal noise due to collision with adjacent parts during vibration. Generally, users may only confirm the position of abnormal noise through the sound heard by their ears. However, this method may be compromised due to the attenuation and interference of sound waves as they propagate through the air, making it difficult to identify the source of the vibrations causing the abnormal noise, and thus challenging to implement effective strategies to resolve the issue of abnormal noise.

SUMMARY

An abnormal noise reproduction device and an abnormal noise reproduction method thereof, which may effectively detect vibrations causing abnormal noise, stably reproduce abnormal sounds, and may easily determine the cause of abnormal noise, are provided in the disclosure, to facilitate users to take effective countermeasures to solve the problem of abnormal noise.

The abnormal noise reproduction device of the disclosure includes at least one measuring device, an analysis device, and a vibration device. The at least one measuring device includes a contact microphone and an accelerometer. The contact microphone is disposed on the abnormal noise generating part of a vehicle, senses vibration sound of the abnormal noise generating part, and generates a vibration sound signal. An acceleration signal is generated by synchronously sensing acceleration of the contact microphone over a time sequence. The analysis device determines when the abnormal noise generating part produces abnormal noise according to the vibration sound signal. The vibration device applies vibration to the vehicle and reproduces the acceleration signal corresponding to the abnormal noise.

An abnormal noise reproduction method of an abnormal noise reproduction device is also provided in the disclosure. The abnormal noise reproduction device includes at least one measuring device. The at least one measuring device includes a contact microphone and an accelerometer. The contact microphone is disposed on the abnormal noise generating part of a vehicle. The abnormal noise reproduction method includes the following operation. Vibration sound signal is generated by sensing vibration sound of an abnormal noise generating part by using the contact microphone. An acceleration signal is generated by synchronously sensing acceleration of the contact microphone over a time sequence by using the accelerometer. When the abnormal noise generating part produces abnormal noise is determined according to the vibration sound signal. Vibration is applied to the vehicle and the acceleration signal is reproduced corresponding to the abnormal noise.

Based on the above, in the embodiments of the disclosure, a vibration sound signal may be generated by sensing vibration sound by using a contact microphone, an acceleration signal may be generated by synchronously sensing the acceleration of the contact microphone by using an accelerometer, abnormal noise is detected by using the vibration sound signal and the acceleration signal, and the abnormal noise may be reproduced by applying vibration to the vehicle and reproducing the acceleration signal corresponding to the abnormal noise. In this way, the use of contact microphones and accelerometers to detect abnormal noise may prevent the accuracy of the detection results from being reduced due to sound wave attenuation or interference, and thereby the vibration causing the abnormal noise may be correctly determined. In addition, abnormal noise may be reproduced continuously by using a vibration device to reproduce the vibration (acceleration signal) of abnormal noise, facilitating users to share and analyze abnormal noise information, and take effective countermeasures to solve the problem of abnormal noise.

In order to make the above-mentioned features and advantages of the disclosure comprehensible, embodiments accompanied with drawings are described in detail below.

BRIEF DESCRIPTION OF THE DRAWINGS

FIG. 8 is a flowchart of a method for locating the position with the maximum abnormal noise according to an embodiment of the disclosure.

DETAILED DESCRIPTION OF DISCLOSED EMBODIMENTS

Figure 1:
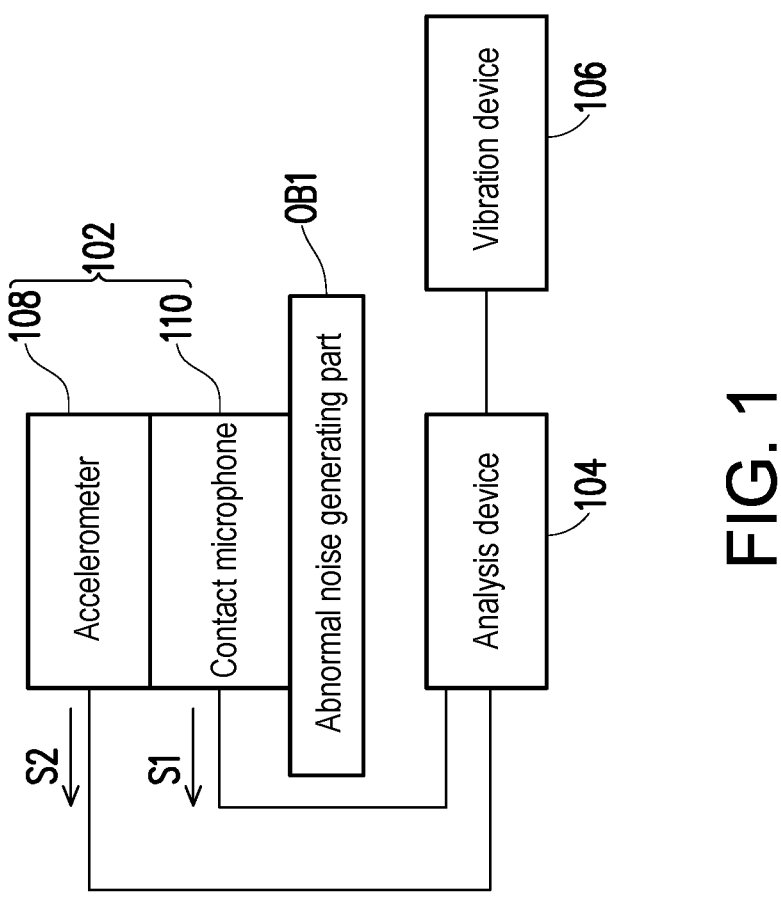
FIG. 1 is a schematic diagram of an abnormal noise reproduction device according to an embodiment of the disclosure.

In order to make the content of the disclosure easier to understand, the following specific embodiments are illustrated as examples of the actual implementation of the disclosure. In addition, wherever possible, elements/components with the same reference numerals in the drawings and embodiments represent the same or similar parts.

In an embodiment of the disclosure, the analysis device divides the acceleration signal in units of first prescribed periods, and performs fast Fourier transform (FFT) analysis on the acceleration signal in each of the first prescribed periods to extract the acceleration signal corresponding to the abnormal noise.

In an embodiment of the disclosure, the analysis device divides the vibration sound signal in units of second prescribed periods, and performs fast Fourier transform analysis on the vibration sound signal in each of the second prescribed periods to determine the generation time of the abnormal noise. The second prescribed period is equal to or shorter than the first prescribed period.

In an embodiment of the disclosure, the analysis device determines characteristics of the vibration corresponding to the abnormal noise according to the vibration sound signal and the acceleration signal.

In an embodiment of the disclosure, the abnormal noise reproduction device includes a first measuring device and a second measuring device. The first measuring device includes a first contact microphone and a first accelerometer. The first contact microphone is disposed on the abnormal noise generating part, senses vibration sound of the abnormal noise generating part, and generates a first vibration sound signal. The first accelerometer synchronously senses acceleration of the first contact microphone over a time sequence to generate a first acceleration signal. The second measuring device includes a second contact microphone and a second accelerometer. The second contact microphone is disposed on the abnormal noise generating part, senses vibration sound of the abnormal noise generating part, and generates a second vibration sound signal. The second accelerometer synchronously senses acceleration of the second contact microphone over a time sequence to generate a second acceleration signal. The analysis device determines a sound pressure difference between the first contact microphone and the second contact microphone according to the first vibration sound signal and the second vibration sound signal, and determines an abnormal noise source position of the abnormal noise generating part according to the sound pressure difference.

In an embodiment of the disclosure, the analysis device determines characteristics of the vibration corresponding to the abnormal noise according to the first vibration sound signal, the first acceleration signal, the second vibration sound signal, and the second acceleration signal.

In an embodiment of the disclosure, the abnormal noise reproduction method of the abnormal noise reproduction device includes: the analysis device divides the acceleration signal in units of first prescribed periods, and performs fast Fourier transform analysis on the acceleration signal in each of the first prescribed periods to extract the acceleration signal corresponding to the abnormal noise.

In an embodiment of the disclosure, the abnormal noise reproduction method of the abnormal noise reproduction device includes: the analysis device divides the vibration sound signal in units of second prescribed periods, and performs Fast Fourier transform analysis on the vibration sound signal in each of the second prescribed periods to determine the generation time of the abnormal noise. The second prescribed period is equal to or shorter than the first prescribed period.

In an embodiment of the disclosure, the abnormal noise reproduction method of the abnormal noise reproduction device includes: the analysis device determines characteristics of the vibration corresponding to the abnormal noise according to the vibration sound signal and the acceleration signal.

In an embodiment of the disclosure, the abnormal noise reproduction device includes a first measuring device and a second measuring device. The first measuring device includes a first contact microphone and a first accelerometer. The second measuring device includes a second contact microphone and a second accelerometer. The first contact microphone and the second contact microphone are disposed on an abnormal noise generating part. The first accelerometer and the second accelerometer are respectively disposed on the first contact microphone and the second contact microphone. The abnormal noise reproduction method includes the following operation. A first vibration sound signal and a second vibration sound signal are generated by sensing the vibration sound of the abnormal noise generating part by using the first contact microphone and the second contact microphone. A first acceleration signal and a second acceleration signal are generated by synchronously sensing an acceleration of a contact microphone over a time sequence by using the first accelerometer and the second accelerometer. A sound pressure difference between the first contact microphone and the second contact microphone is determined according to the first vibration sound signal and the second vibration sound signal, and an abnormal noise source position of the abnormal noise generating part is determined according to the sound pressure difference.

In an embodiment of the disclosure, the abnormal noise reproduction method of the abnormal noise reproduction device includes: the analysis device determines characteristics of the vibration corresponding to the abnormal noise according to the first vibration sound signal, the first acceleration signal, the second vibration sound signal, and the second acceleration signal.

FIG. 1 is a schematic diagram of an abnormal noise reproduction device according to an embodiment of the disclosure, please refer to FIG. 1. The abnormal noise reproduction device may be, for example, the measuring device 102, the analysis device 104, and the vibration device 106. The measuring device 102 may include an accelerometer 108 and a contact microphone 110. The accelerometer 108 and the contact microphone 110 are coupled to the analysis device 104. The analysis device 104 is also coupled to the vibration device 106. The accelerometer 108 and the contact microphone 110 may be disposed on the abnormal noise generating part OB1 of the vehicle, for example, on the dashboard of the vehicle, but not limited thereto. The contact microphone 100 may sense the vibration sound of the abnormal noise generating part OB1 and generate the vibration sound signal S1. The accelerometer 108 is disposed on the contact microphone 110. The accelerometer 108 may generate the acceleration signal S2 by synchronously sensing the acceleration of the contact microphone 110 over a time sequence. That is to say, the accelerometer 108 and the contact microphone 110 perform measurements synchronously, and generate the acceleration signal S2 and the vibration sound signal S1 over a time sequence. The accelerometer 108 may be, for example, a three-dimensional accelerometer, but not limited thereto. In addition, the accelerometer 108 only needs to synchronously measure the acceleration of the contact microphone 110 over a time sequence and generate the acceleration signal S2, and may be disposed at a different position from the contact microphone 110. The analysis device 104 may determine when the abnormal noise generating part OB1 produces abnormal noise according to the vibration sound signal S1. In addition, the vibration device 106 may apply vibration to the vehicle and reproduce the acceleration signal S2 corresponding to the abnormal noise.

Figure 2:
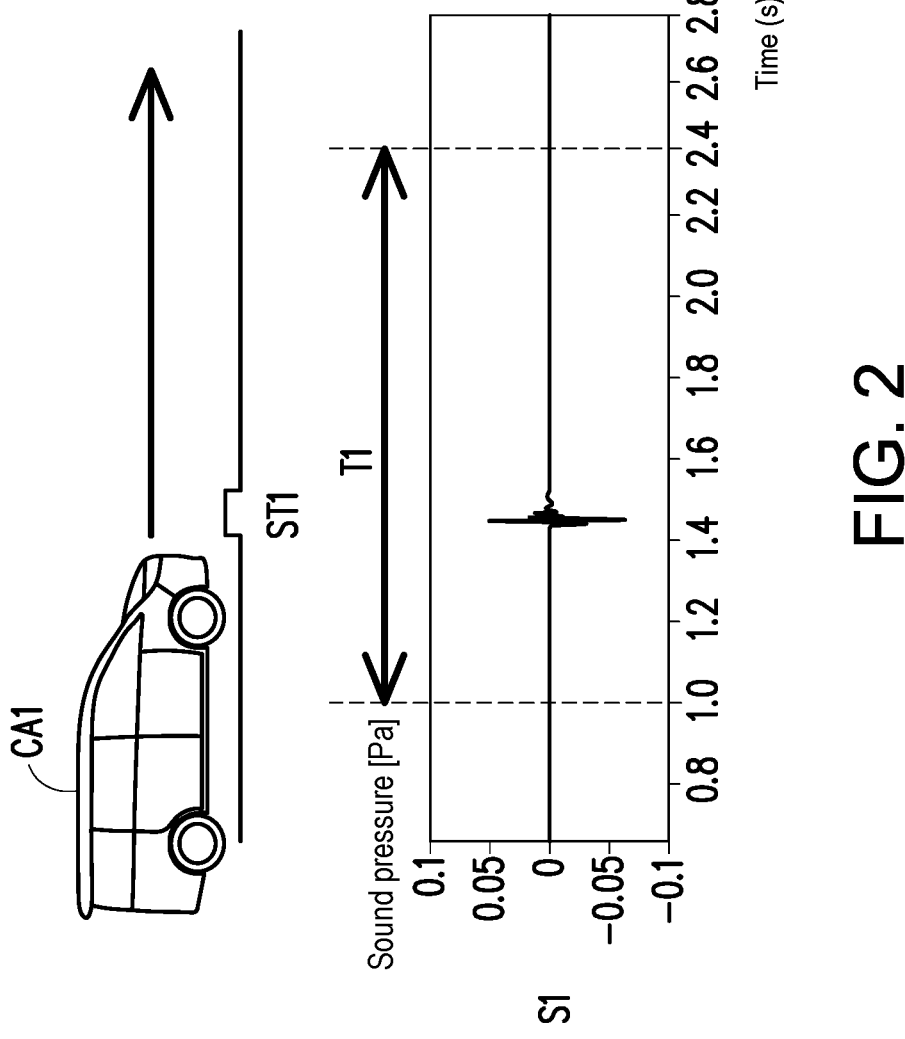
FIG. 2 is a schematic diagram of abnormal noise generated by a vehicle according to an embodiment of the disclosure.

For example, as shown in FIG. 2, when the vehicle CA1 travels through the step ST1, the tires of the vehicle CA1 are impacted by the step ST1, causing multiple parts on the vehicle CA1 to vibrate. At this time, some parts may produce abnormal noise due to collision with adjacent parts. The measuring device 102 may be disposed on a part that generates abnormal noise (e.g., disposed on the abnormal noise generating part OB1 in FIG. 1) to measure the vibration of the abnormal noise generating part OB1 while the vehicle CA1 is traveling. For example, in the embodiment of FIG. 2, the analysis device 104 may analyze the sensing data of the measuring device 102 during a period of time before and after the tire of the vehicle CA1 collides with the step ST1, that is, the vibration sound signal S1 in the period T1 is analyzed, and the acceleration signal S2 in the period T1 may also be analyzed together.

Figure 3:
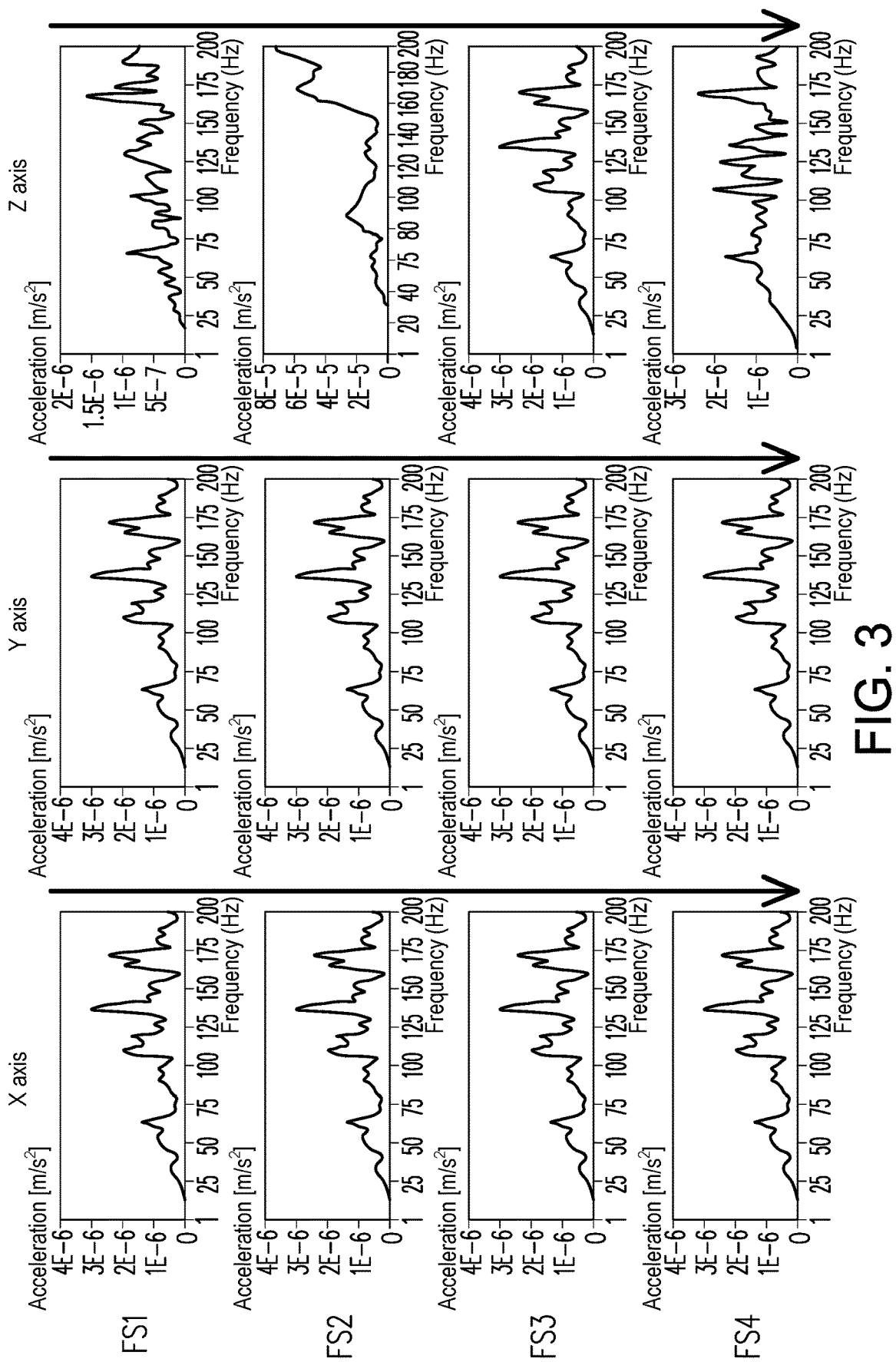
FIG. 3 is a waveform diagram of an acceleration signal after fast Fourier transformation according to an embodiment of the disclosure.

For example, in the embodiment of FIG. 3, the analysis device 104 divides the acceleration signal S2 in the period T1 in units of the first prescribed period, dividing the acceleration signal S2 into four first prescribed periods, and performs a fast Fourier transform on the acceleration signals S2 of each divided first prescribed period over a time sequence, thereby obtaining the acceleration signals FS1 to FS4, which have been processed by the fast Fourier transform, corresponding to the four first prescribed periods. In this embodiment, the accelerometer 108 is implemented as a three-dimensional accelerometer, so the acceleration signals FS1 to FS4 may respectively include signals in the X axis, Y axis, and Z axis directions. The analysis device 104 may determine the vibration corresponding to the abnormal noise according to the acceleration signals FS1 to FS4, and then determine the characteristics of the abnormal noise. For example, in the embodiment of FIG. 3, the analysis device 104 may respectively compare the amplitude variations of the acceleration signals FS1 to FS4 in the X axis, Y axis, and Z axis directions, to determine the direction of the vibration corresponding to abnormal noise. In FIG. 3, it may be seen that the amplitude variations of the acceleration signals FS1 to FS4 in the X axis and Y axis directions are similar, while in the Z axis direction, the amplitude variation of the acceleration signal FS2 is not similar to the amplitude variation of the acceleration signals FS1, FS3, and FS4, especially at 90 Hz and 170 Hz, where the amplitude of the acceleration signal FS2 is significantly greater than the amplitudes of the acceleration signals FS1, FS3, and FS4. Therefore, the analysis device 104 may determine the vibration direction (Z axis direction), frequency, and acceleration corresponding to the abnormal noise. In addition, the acceleration signals FS1 to FS4 in the X axis and Y axis directions and the acceleration signals FS1, FS3, and FS4 in the Z axis direction are acceleration signals corresponding to the inherent vibration of the abnormal noise generating part OB1.

Figure 4:
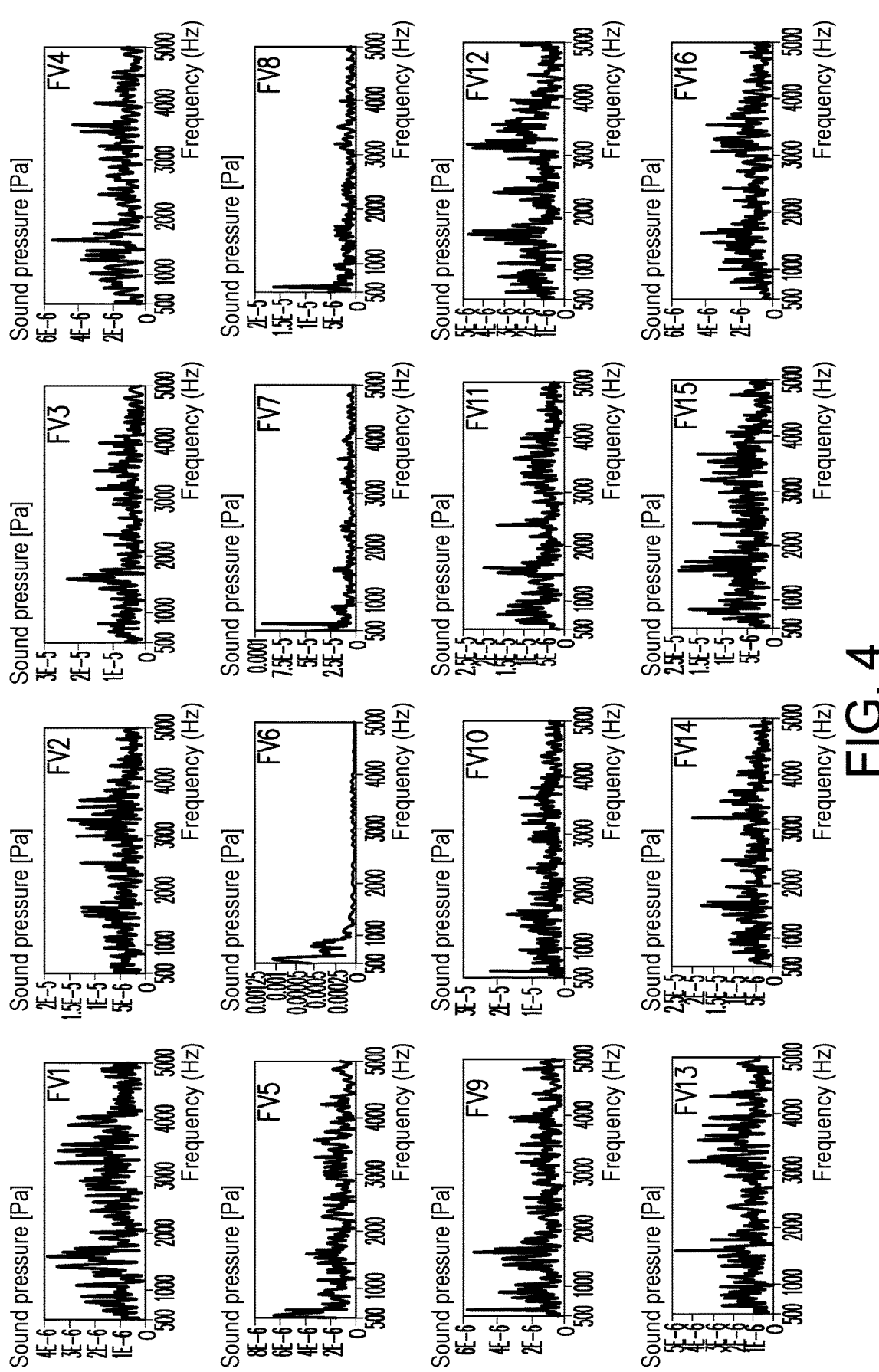
FIG. 4 is a waveform diagram of a vibration sound signal after fast Fourier transformation according to an embodiment of the disclosure.

In addition, as shown in the embodiment of FIG. 4, the analysis device 104 may also divide the vibration sound signal S1 in the period T1 into units of the second prescribed period, dividing the vibration sound signal S1 into 16 second prescribed periods, and performs a fast Fourier transform on the vibration sound signal S1 of each divided second prescribed period over a time sequence, thereby obtaining the acceleration signals FV1 to FV16, which have been processed by the fast Fourier transform, corresponding to the 16 second prescribed periods. Similarly, the analysis device 104 may compare the amplitude variation of the vibration sound signals FV1 to FV16 to determine the time when abnormal noise is generated. In FIG. 4, it may be seen that the amplitude variation of the vibration sound signals FV1 to FV5 and FV9 to FV16 are similar, while the amplitude variation of the vibration sound signals FV6 to FV8 are not similar to the amplitude variation of the vibration sound signals FV1 to FV5 and FV9 to FV16. The vibration sound signal FV6 has a significantly larger amplitude at 500 Hz to 1000 Hz than the vibration sound signals FV1 to FV5 and FV9 to FV16. The amplitude attenuation may be seen in the vibration sound signals FV7 and FV8. Therefore, the analysis device 104 may determine that the time when the abnormal noise is generated is the second prescribed period corresponding to the vibration sound signal FV6. In addition, the vibration sound signals FV1 to FV5 and FV9 to FV16 are vibration sound signals corresponding to the natural vibration of the abnormal noise generating part OB1.

Since the second prescribed period in the embodiment of FIG. 4 is equal to or shorter than the first prescribed period, the time that the abnormal noise is generated may be accurately determined by the vibration sound signals FV1 to FV16 of the embodiment of FIG. 4, measuring transient abnormal noise that is difficult for the human ear to detect. At this time, the second prescribed period may be set to be the same as the first prescribed period. In addition, the contact microphone 110 may be used to directly detect the vibration corresponding to the abnormal noise of the abnormal noise generating part OB1, thereby avoiding attenuation or interference when sound waves propagate in the air, thereby causing inaccurate detection results. Therefore, the accuracy of detecting vibration corresponding to abnormal noise may be further improved. It is worth noting that in other embodiments, the acceleration signal S2 and the vibration sound signal S1 may also be divided into the first prescribed period and the second prescribed period of different time lengths, and are not limited to the above embodiment.

Figure 5:
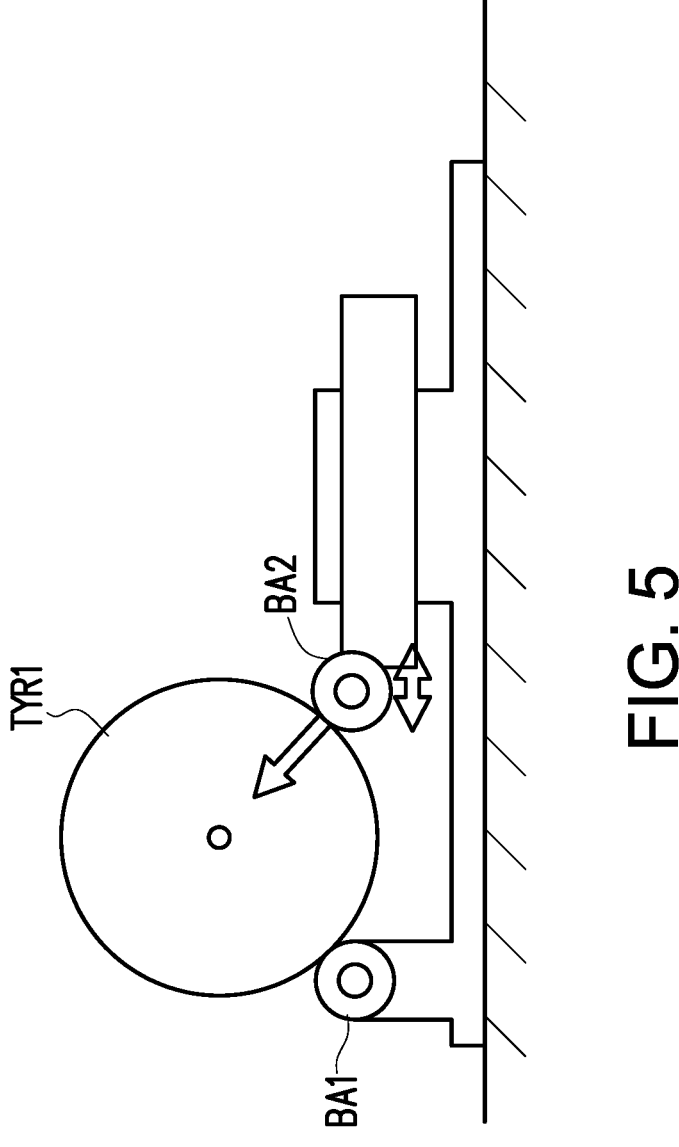
FIG. 5 is a schematic diagram of applying vibration to a vehicle according to an embodiment of the disclosure.

After the analysis device 104 analyzes the characteristics of the vibration corresponding to the abnormal noise according to the vibration sound signal S1 and the acceleration signal S2, the vibration device 106 may apply vibration to the vehicle to reproduce the acceleration signal S2 corresponding to the abnormal noise. For example, as shown in FIG. 5, the vibration device 106 may include a fixing rod BA1 and a vibration rod BA2. The fixing rod BA1 and the vibration rod BA2 may clamp the tire TYR1 of the vehicle CA1. The vibration rod BA2 may vibrate in the front and rear direction of the vehicle CA1 (vibrate in the direction perpendicular to the axial direction of the tire TYR1), and apply vibration to the tire TYR1 at the contact point between the vibration rod BA2 and the tire TYR1, to simulate the situation when the tire TYR1 collides with the step ST1. The vibration device 106 may, for example, apply vibration to the tire TYR1 at a fixed frequency, or continuously apply vibration to the tire TYR1 in a frequency sweep manner within a preset frequency range (e.g., 1 to 100 Hz, but not limited thereto) to continuously reproduce the acceleration signal S2 corresponding to the abnormal noise. Since the acceleration signal S2 and the abnormal noise of the abnormal noise are continuously reproduced, it may be more efficient than reproducing the abnormal noise through the traveling vehicle CA1. In addition, it is easier to share abnormal noise information. For example, the abnormal noise information may be shared by recording the acceleration signal S2 and the abnormal noise in sound or image.

In addition, in other embodiments, the vibration device 106 may also apply vibrations to other parts of the vehicle CA1 in different directions.

Figure 6:
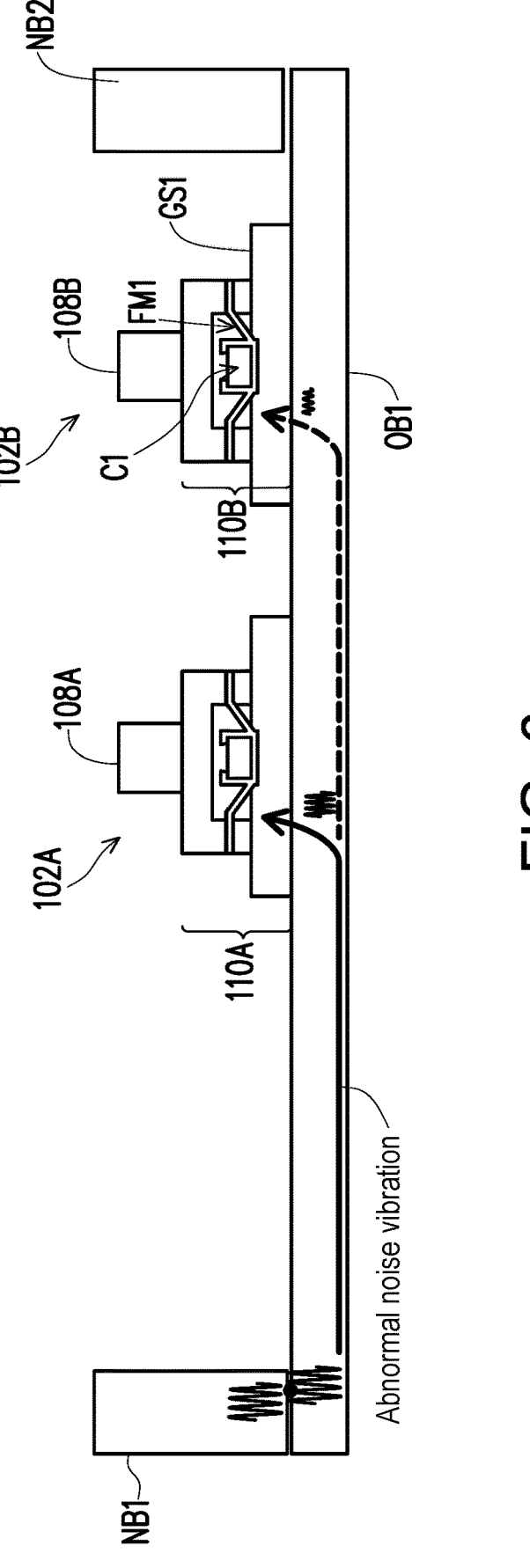
FIG. 6 is a schematic diagram of sensing abnormal noise according to an embodiment of the disclosure.

In some embodiments, the abnormal noise reproduction device may include multiple measuring devices 102. For example, as shown in FIG. 6, the abnormal noise reproduction device may include measuring devices 102A and 102B. Similarly, the measuring devices 102A and 102B may be disposed (attached) on the abnormal noise generating part OB1, and the measuring devices 102A and 102B may be separated by a preset distance. In the embodiment of FIG. 6, the abnormal noise generating part OB1 is adjacent to the parts NB1 and NB2. The abnormal noise source is at the adjacent part of the abnormal noise generating part OB1 and the part NB1. The abnormal noise generated by the collision of the abnormal noise generating part OB1 and the part NB1 may be transmitted through the abnormal noise generating part OB1. The measuring devices 102A and 102B may measure the inherent vibration of the abnormal noise generating part OB1 and the vibration sound of the abnormal noise transmitted by the abnormal noise generating part OB1. The measuring device 102A may include an accelerometer 108A and a contact microphone 110A, and the measuring device 102B may include an accelerometer 108B and a contact microphone 110B. Furthermore, the contact microphones 110A and 110B may respectively include a gel sheet GS1, a film FM1, and a condenser microphone C1. At this time, the accelerometers 108A and 108B may synchronously measure the acceleration of the contact microphone 110 over a time sequence and generate a first acceleration signal and a second acceleration signal. In addition, the accelerometers 108A and 108B may be respectively disposed on the contact microphones 110A and 110B, or may be disposed at other positions. In some embodiments, the condenser microphone C1 may be adjusted for a specific frequency range (e.g., the vibration frequency range for abnormal noise) to more accurately detect tiny abnormal noise that is difficult for human ears to hear, without relying on the hearing and memory of the user to determine whether abnormal noise is produced.

Figure 7A:
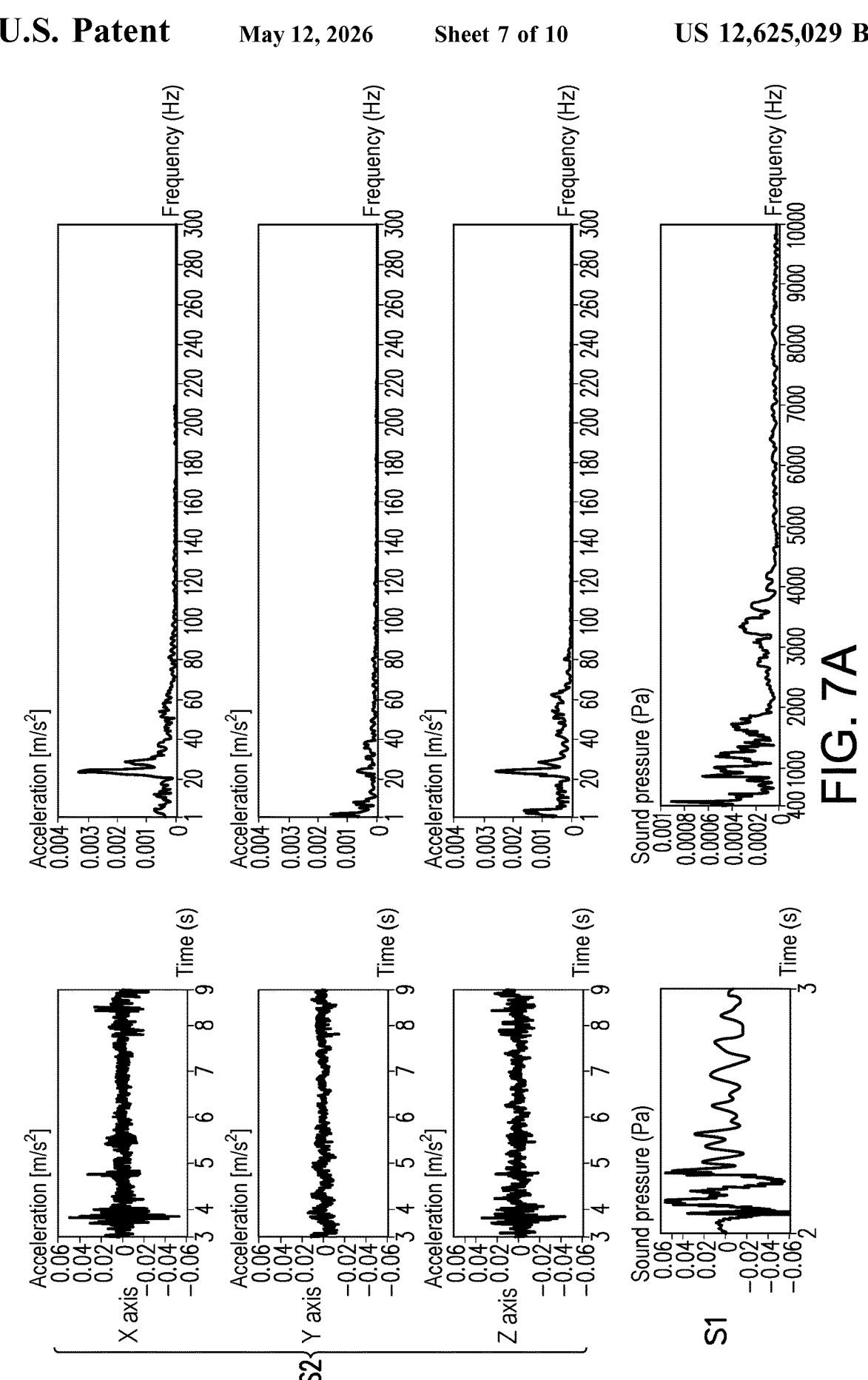
FIG. 7A and FIG. 7B are waveform diagrams of the sensing results of the accelerometer and the contact microphone and the sensing results after fast Fourier transformation according to an embodiment of the disclosure.
Figure 7B:
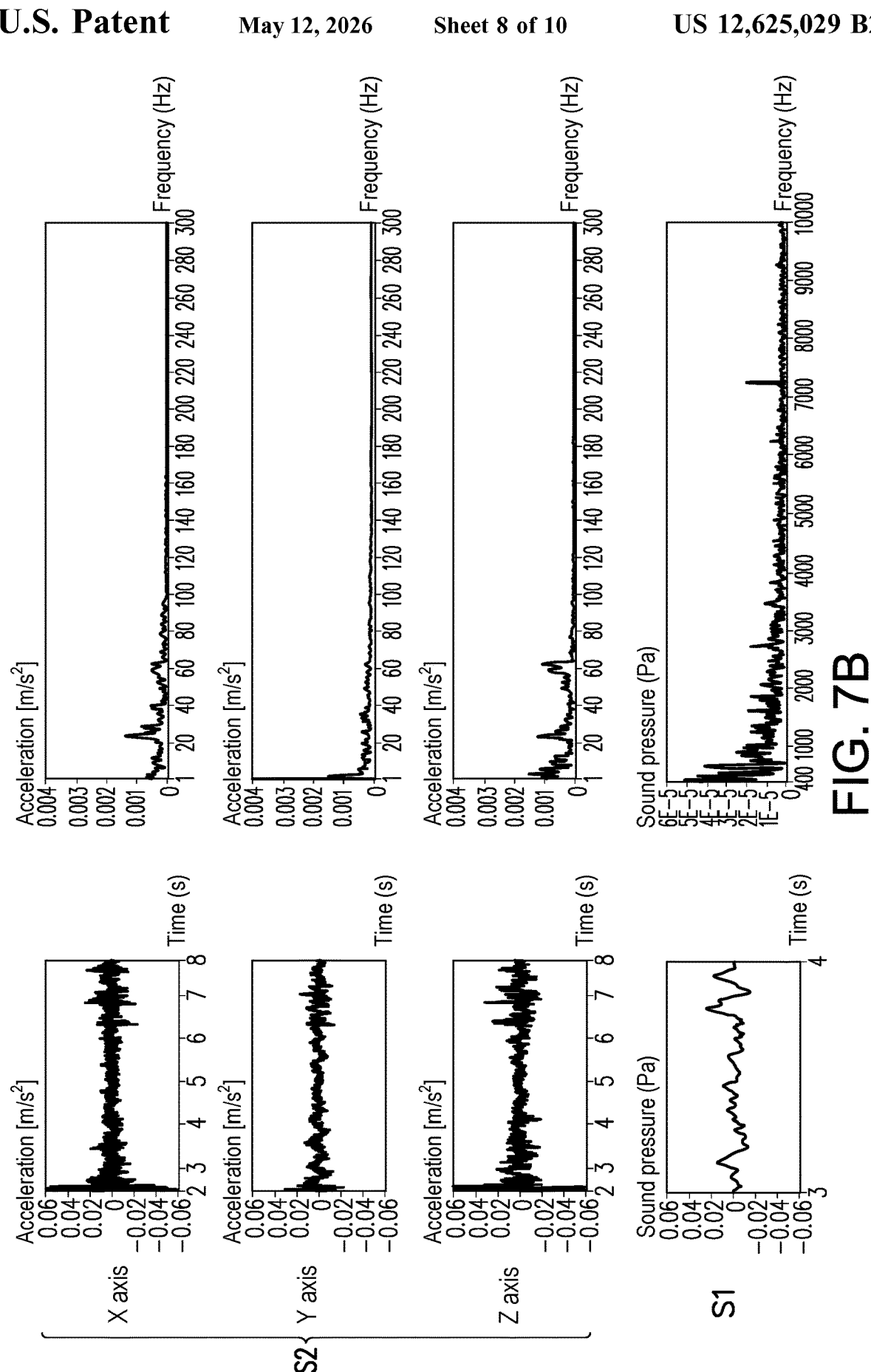

In the embodiment of FIG. 6, the measuring device 102A is closer to the abnormal noise source than the measuring device 102B, so the acceleration signal and vibration sound signal of the abnormal noise measured by the measuring device 102A have larger amplitudes. As shown in FIG. 7A and FIG. 7B, FIG. 7A is a waveform diagram of the acceleration signal S2 and the vibration sound signal S1 measured by the measuring device 102A after undergoing fast Fourier transform processing. FIG. 7B is a waveform diagram of the acceleration signal S2 and the vibration sound signal S1 measured by the measuring device 102B after undergoing fast Fourier transform processing. Since the measuring device 102A is closer to the abnormal noise source than the measuring device 102B, it may be clearly seen in FIG. 7A that the acceleration signal S2, after being processed by the Fourier transformation, exhibits vibrations corresponding to the abnormal noise at 20 Hz in the X axis and Z axis directions. Furthermore, in the vibration sound signal S1 that has also been processed through the Fourier transformation, vibrations corresponding to the abnormal noise may be observed in the frequency range of 400 to 4500 Hz. In FIG. 7B, the vibration at 20 Hz in the X and Z axis directions of the acceleration signal S2, processed through Fourier transformation, and the vibration within the frequency range of 400 to 4500 Hz in the sound vibration signal S1, also processed through Fourier transformation, are relatively less noticeable.

In order to improve the measurement accuracy of the measuring device 102A compared to the measuring device 102B, the measuring device 102A may be placed as close as possible to the abnormal noise source. The analysis device 104 may, for example, determine the sound pressure difference (amplitude difference) between the contact microphone 110A and the contact microphone 110B by using the vibration sound signal S1 provided by the contact microphone 110A and the vibration sound signal S1 provided by the contact microphone 110B, and find the abnormal noise source according to the sound pressure difference between the contact microphone 110A and the contact microphone 110B. The method of finding the abnormal noise source according to the sound pressure difference is shown in FIG. 8. First, measuring devices 102A and 102B are disposed on the abnormal noise generating part OB1 (step S802). The distance between the measuring devices 102A and 102B may be determined by the size of the abnormal noise generating part OB1 or the size of the abnormal noise. Next, vibration sound signals are respectively generated by measuring the vibration of the abnormal noise generating part OB1 by using the measuring devices 102A and 102B (steps S804A and S804B). Then, fast Fourier transform processing is performed on the vibration sound signals provided by the measuring devices 102A and 102B (steps S806A and S806B) to obtain vibration sound signals that have undergone the fast Fourier transform processing. Afterwards, the amplitudes in the preset frequency range (e.g., 500 Hz to 8000 Hz, but not limited thereto) in the vibration sound signal that have undergone the fast Fourier transform processing are added to obtain a sum A and a sum B respectively (step S808A and S808B), and whether the absolute value of the difference between the sum A and the sum B is less than or equal to a preset value is determined (step S810). Since the absolute difference between the sum A and the sum B decreases as the devices get closer to the abnormal noise source, if this absolute difference is not less than or equal to a preset value, it indicates that the measuring devices 102A and 102B are still not close enough to the abnormal noise source. In this case, the positions of the measuring devices 102A and 102B may be moved to bring them closer to the abnormal noise source, in order to obtain more optimal measurement results. If the sum A is greater than the sum B, it indicates that the measuring device 102A is closer to the abnormal noise source, and the measuring devices 102A and 102B may be moved toward the side of the measuring device 102A (step S812A). If the sum B is greater than the sum A, it indicates that the measuring device 102B is closer to the abnormal noise source, and the measuring devices 102A and 102B may be moved toward the side of the measuring device 102B (step S812B). After adjusting the positions of the measuring devices 102A and 102B, one may return to steps S804A and S804B to re-execute the vibration measurement process.

On the contrary, if it is determined in step S810 that the absolute difference between the sum A and the sum B is less than or equal to the preset value, it indicates that the measuring devices 102A and 102B are close enough to the abnormal noise source. In the case where the sum A is greater than the sum B, the measuring device 102A may be moved in units of a smaller preset moving distance, and it may be determined whether the current sum A is greater than the previous sum A (step S814A), in order to locate the position closest to the abnormal noise source. When the current sum A is greater than the previous sum A, it may be determined that the position is closest to the abnormal noise source, and the position with the maximum abnormal noise may be recorded (step S816A). Similarly, in the case where the sum B is greater than the sum A, the measuring device 102B may be moved in units of the preset moving distance, and it may be determined whether the current sum B is greater than the previous sum B (step S814B), in order to locate the position closest to the abnormal noise source. When the current sum B is greater than the previous sum B, it may be determined that the position is closest to the abnormal noise source, and the position with the maximum abnormal noise may be recorded (step S816B). After finding the position closest to the abnormal noise source, the analysis device 104 may detect and determine the characteristics of the abnormal noise by using the vibration sound signals and acceleration signals provided by the measuring devices 102A and 102B, as shown in the embodiments of FIG. 1 to FIG. 5. Moreover, by applying vibration to the vehicle, the acceleration signal corresponding to the abnormal noise is reproduced. Since the implementation method is similar to the aforementioned embodiments, the detailed implementation is not repeated herein.

Figure 9:
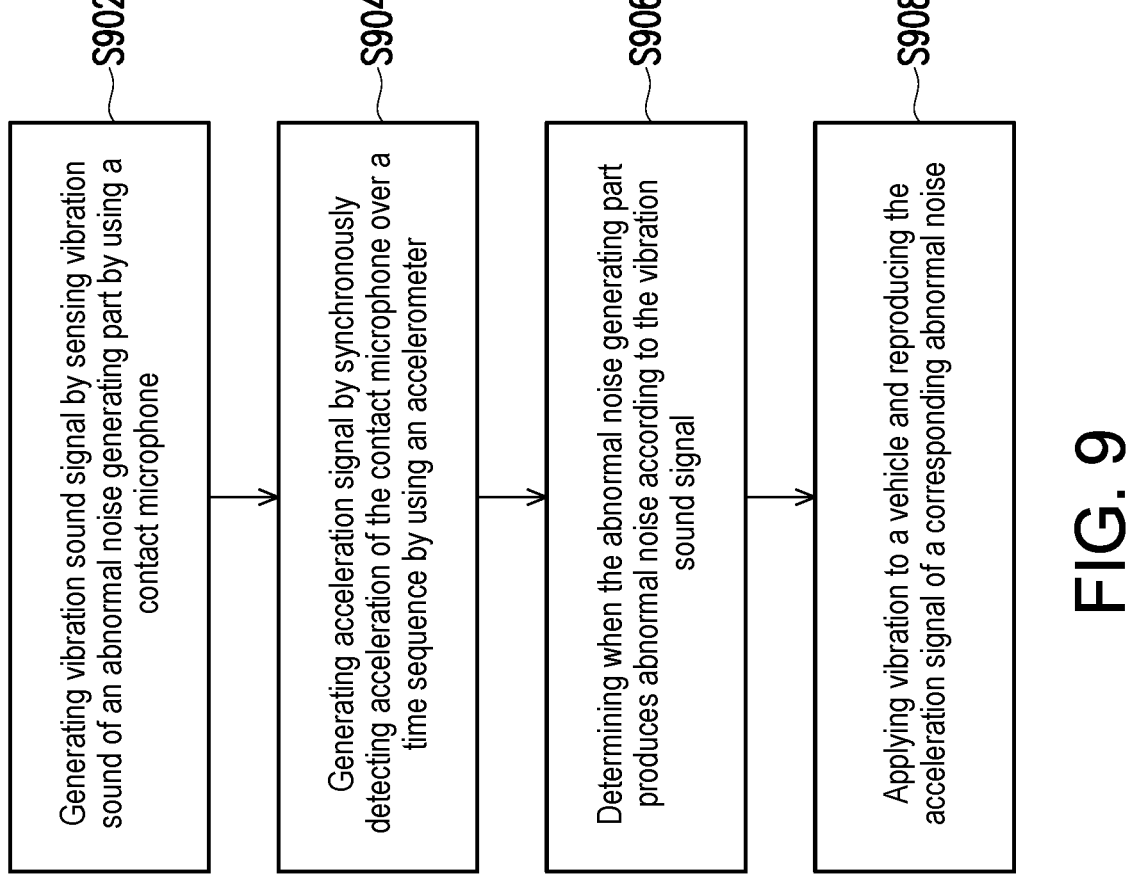
FIG. 9 is a flowchart of an abnormal noise reproduction method of an abnormal noise reproduction device according to an embodiment of the disclosure.

FIG. 9 is a flowchart of an abnormal noise reproduction method of an abnormal noise reproduction device according to an embodiment of the disclosure. The abnormal noise reproduction device includes a measuring device. The measuring device includes a contact microphone and an accelerometer. The contact microphone is disposed on the abnormal noise generating part of a vehicle. The accelerometer may be, for example, a three-dimensional accelerometer. It may be known from the above embodiments that the abnormal noise reproduction method of the abnormal noise reproduction device may include at least the following steps. Firstly, vibration sound signal is generated by sensing vibration sound of an abnormal noise generating part by using the contact microphone (step S902). Next, an acceleration signal may be generated by synchronously sensing the acceleration of the contact microphone by using an accelerometer (step S904), characteristics of the vibration corresponding to the abnormal noise may be determined according to the vibration sound signal and the acceleration signal. For example the acceleration signal may be divided in units of first prescribed periods, and fast Fourier transform (FFT) analysis is performed on the acceleration signal in each of the first prescribed periods to extract the acceleration signal corresponding to the abnormal noise. Afterwards, when the abnormal noise generating part produces abnormal noise is determined according to the vibration sound signal (step S906). Furthermore, the vibration sound signal may be divided in units of second prescribed periods, and performs Fast Fourier transform analysis on the vibration sound signal in each of the second prescribed periods to determine the generation time of the abnormal noise. The second prescribed period may be set to be shorter than the first prescribed period or equal to the first prescribed period. Finally, vibration is applied to the vehicle and the acceleration signal is reproduced corresponding to the abnormal noise (step S908).

In some embodiments of the disclosure, the abnormal noise reproduction device may include multiple measuring devices, such as a first measuring device and a second measuring device. The first measuring device includes a first contact microphone and a first accelerometer. The second measuring device includes a second contact microphone and a second accelerometer. The first contact microphone and the second contact microphone are disposed on an abnormal noise generating part to sense the acceleration of the first contact microphone and the second contact microphone. Similarly, the characteristics of the vibration of the abnormal noise may also be determined by the first vibration sound signal and the second vibration sound signal generated by the first contact microphone and the second contact microphone sensing the vibration of the abnormal noise generating part and also be determined by the first acceleration signal and the second acceleration signal generated by the first accelerometer and the second accelerometer sensing the acceleration of the contact microphone, and details are not repeated herein. In this embodiment, the sound pressure difference between the first contact microphone and the second contact microphone may also be determined according to the first vibration sound signal and the second vibration sound signal provided by the first contact microphone and the second contact microphone, and the position of the abnormal noise source of the abnormal noise generating part is determined according to the sound pressure difference, in order to optimize the placements of the first measuring device and the second measuring device, and enhance the measurement quality of the first measuring device and the second measuring device.

To sum up, in the embodiments of the disclosure, a vibration sound signal may be generated by sensing vibration sound by using a contact microphone, an acceleration signal may be generated by synchronously sensing the acceleration of the contact microphone by using an accelerometer, abnormal noise is detected by using the vibration sound signal and the acceleration signal, and the abnormal noise may be reproduced by applying vibration to the vehicle and reproducing the acceleration signal corresponding to the abnormal noise. In this way, the use of contact microphones and accelerometers to detect abnormal noise may prevent the accuracy of the detection results from being reduced due to sound wave attenuation or interference, and thereby the vibration causing the abnormal noise may be correctly determined. In addition, abnormal noise may be reproduced continuously by using a vibration device to reproduce the vibration (acceleration signal) of abnormal noise, facilitating users to share and analyze abnormal noise information, and take effective countermeasures to solve the problem of abnormal noise. In some embodiments, the abnormal noise source position of the abnormal noise generating part may be located using vibration sound signals provided by multiple measuring devices, in order to optimize the placement of these devices and enhance the quality of their measurements.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the claims.

What is claimed is:
1. An abnormal noise reproduction device, comprising:
at least one measuring device, comprising:
   a contact microphone, disposed on an abnormal noise generating part of a vehicle, sensing vibration sound of the abnormal noise generating part and generating a vibration sound signal; and
   an accelerometer, coupled to the contact microphone, synchronously sensing acceleration of the contact microphone over a time sequence and generating an acceleration signal;
   a processor, determining when the abnormal noise generating part produces abnormal noise according to the vibration sound signal; and a vibration device comprising a fixing rod and a vibration rod configured to clamp a tire of the vehicle to apply vibration to the vehicle and reproducing the acceleration signal corresponding to the abnormal noise.

2. The abnormal noise reproduction device according to claim 1, wherein the processor divides the acceleration signal in units of first prescribed periods, and performs fast Fourier transform (FFT) analysis on the acceleration signal in each of the first prescribed periods to extract the acceleration signal corresponding to the abnormal noise.

3. The abnormal noise reproduction device according to claim 2, wherein the processor divides the vibration sound signal in units of second prescribed periods, and performs fast Fourier transform analysis on the vibration sound signal in each of the second prescribed periods to determine generation time of the abnormal noise, wherein the second prescribed period is equal to or shorter than the first prescribed period.

4. The abnormal noise reproduction device according to claim 1, wherein the processor determines characteristics of vibration corresponding to the abnormal noise according to the vibration sound signal and the acceleration signal.

5. The abnormal noise reproduction device according to claim 1, comprising:

a first measuring device, comprising:

a first contact microphone, disposed on the abnormal noise generating part, sensing vibration sound of the abnormal noise generating part and generating a first vibration sound signal; and a first accelerometer, synchronously sensing acceleration of the first contact microphone over a time sequence and generating a first acceleration signal;

a second measuring device, comprising:

a second contact microphone, disposed on the abnormal noise generating part, sensing vibration sound of the abnormal noise generating part and generating a second vibration sound signal; and a second accelerometer, synchronously sensing acceleration of the second contact microphone over a time sequence and generating a second acceleration signal, wherein the processor determines a sound pressure difference between the first contact microphone and the second contact microphone according to the first vibration sound signal and the second vibration sound signal, and determines an abnormal noise source position of the abnormal noise generating part according to the sound pressure difference.

6. The abnormal noise reproduction device according to claim 5, wherein the processor determines characteristics of vibration corresponding to the abnormal noise according to the first vibration sound signal, the first acceleration signal, the second vibration sound signal, and the second acceleration signal.

7. An abnormal noise reproduction method of an abnormal noise reproduction device, wherein the abnormal noise reproduction device comprises at least one measuring device, the at least one measuring device comprises a contact microphone and an accelerometer, the contact microphone is coupled to the accelerometer, the contact microphone is disposed on an abnormal noise generating part of a vehicle, the abnormal noise reproduction method comprises:

generating a vibration sound signal by sensing vibration sound of the abnormal noise generating part by using the contact microphone;

generating an acceleration signal by synchronously sensing acceleration of the contact microphone over a time sequence by using the accelerometer;

determining when the abnormal noise generating part produces abnormal noise according to the vibration sound signal;

applying vibration to the vehicle and reproducing the acceleration signal corresponding to the abnormal noise.

8. The abnormal noise reproduction method of the abnormal noise reproduction device according to claim 7, comprising:

dividing the acceleration signal in units of first prescribed periods, and performing fast Fourier transform analysis on the acceleration signal in each of the first prescribed periods to extract the acceleration signal corresponding to the abnormal noise.

9. The abnormal noise reproduction method of the abnormal noise reproduction device according to claim 8, comprising:

dividing the vibration sound signal in units of second prescribed periods, and performing fast Fourier transform analysis on the vibration sound signal in each of the second prescribed periods to determine generation time of the abnormal noise, wherein the second prescribed period is equal to or shorter than the first prescribed period.

10. The abnormal noise reproduction method of the abnormal noise reproduction device according to claim 7, comprising:

determining characteristics of vibration corresponding to the abnormal noise according to the vibration sound signal and the acceleration signal.

11. The abnormal noise reproduction method of the abnormal noise reproduction device according to claim 7, wherein the abnormal noise reproduction device comprises a first measuring device and a second measuring device, the first measuring device comprises a first contact microphone and a first accelerometer, the second measuring device comprises a second contact microphone and a second accelerometer, the first contact microphone and the second contact microphone are disposed on the abnormal noise generating part, the abnormal noise reproduction method comprises:

generating a first vibration sound signal and a second vibration sound signal by sensing vibration sound of the abnormal noise generating part by using the first contact microphone and the second contact microphone;

generating a first acceleration signal and a second acceleration signal by synchronously sensing acceleration of the first contact microphone and the second contact microphone over a time sequence by using the first accelerometer and the second accelerometer; and determining a sound pressure difference between the first contact microphone and the second contact microphone according to the first vibration sound signal and the second vibration sound signal, and determining an abnormal noise source position of the abnormal noise generating part according to the sound pressure difference.

12. The abnormal noise reproduction method of the abnormal noise reproduction device according to claim 11, comprising:

determining characteristics of vibration corresponding to the abnormal noise according to the first vibration sound signal, the first acceleration signal, the second vibration sound signal, and the second acceleration signal.

* * * * *